US006556674B1

United States Patent
Li et al.

(10) Patent No.: US 6,556,674 B1
(45) Date of Patent: Apr. 29, 2003

(54) SIGNAL DETECTOR WITH MATCHED FILTER COEFFICIENT

(75) Inventors: Jin Li, Austin, TX (US); Vijayakumaran Velayudhan Nair, Austin, TX (US); Yan Zhou, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/196,258

(22) Filed: Nov. 19, 1998

(51) Int. Cl.[7] .................................................. H04M 3/00
(52) U.S. Cl. ...................................... 379/386; 379/283
(58) Field of Search ................................ 379/386, 350, 379/382, 383

(56) References Cited

U.S. PATENT DOCUMENTS

| 5,588,053 | A |   | 12/1996 | Xie |   |
|---|---|---|---|---|---|
| 5,644,634 | A | * | 7/1997 | Xie et al. | 379/386 |
| 5,809,133 | A | * | 9/1998 | Bartkowiak et al. | 379/386 |
| 6,269,093 | B1 | * | 7/2001 | Alapuranen et al. | 370/343 |

OTHER PUBLICATIONS

Digital Signal Processing Applications Using the ADSP–2100 Family, vol. 1 by the Applications Engineering Staff of Analog Devices, DSP Division, Edited by Army, Mar. 1992 by Analog Devices, Inc., pp. 456–477.

* cited by examiner

Primary Examiner—Forester W. Isen
Assistant Examiner—Jefferey Harold
(74) Attorney, Agent, or Firm—Williams, Morgan & Amerson PC

(57) ABSTRACT

A signal detector for detecting at least a first signal having a first frequency includes a matched transform unit and an energy level threshold unit. The matched transform unit is adapted to receive at least a first frame of time domain input samples at a sampling frequency and generate at least a first frequency energy value for the first frame based on at least a first subset of the time domain input samples and a first matched filter coefficient. The sampling frequency is a non-integral multiple of the first frequency, and the first matched filter coefficient depends on the first frequency. The energy level threshold unit is adapted to compare the first frequency energy value to a threshold energy value to determine the presence of the first signal. A method for detecting at least a first signal having a first frequency is provided. The method includes receiving at least a first frame of time domain input samples at a sampling frequency. At least a first frequency energy value for the first frame is generated based on at least a first subset of the time domain input samples and a first matched filter coefficient. The sampling frequency is a non-integral multiple of the first frequency, and the first matched filter coefficient depends on the first frequency. The first frequency energy value is compared to a threshold energy value to determine the presence of the first signal.

49 Claims, 4 Drawing Sheets

SIGNAL DETECTOR WITH MATCHED FILTER COEFFICIENT

BACKGROUND OF THE INVENTION

1. Field of the Invention

The present invention relates generally to the detection of dual tone multi-frequency (DTMF) coded signals, and more particularly, to detecting DTMF coded signals with improved frequency selectivity.

2. Description of the Related Art

DTMF is the signaling standard for the Touch Tone system. Two tones are combined to define a DTMF digit. Table 1 shows the matrix of frequencies used to encode the 16 DTMF symbols on a typical 4×4 matrix telephone keypad. Each DTMF tone consists of two sine waves. One sine wave is from the low-frequency band (row frequency), and the other frequency is from the high-frequency band (column frequency).

TABLE 1

|     | 1209 | 1336 | 1477 | 1633 |
|-----|------|------|------|------|
| 697 | 1    | 2    | 3    | A    |
| 770 | 4    | 5    | 6    | B    |
| 852 | 7    | 8    | 9    | C    |
| 941 | *    | 0    | #    | D    |

Various methods have been used for DTMF generation and detection. Previously, analog circuitry had been used to generate and decode DTMF digits. More recently, the functions have been implemented using digital signal processors (DSP) to improve the accuracy, precision, stability, reprogrammability, and cost. A popular DSP algorithm for DTMF detection is the Goertzel algorithm. One such previous method is described in U.S. Pat. No. 5,644,634, issued to Zheng-yi Xie et al., entitled "System and Method for Dual Tone Multifrequency Detection Using Variable Frame Widths," the specification of which is hereby incorporated by reference in its entirety.

In general, a DTMF detector examines the line or communication channel for the presence of two sinusoids using dedicated frequency domain algorithms, including modified Goertzel algorithms, DFT/FFTs, auto-correlation, zero crossing counting, and narrow band filter-based methods, among others.

A common technique for determining energy values in the frequency domain is performed by transforming the time domain sampling data to frequency domain data using a variant of the discrete Fourier transform (DFT) called the Goertzel algorithm. The transfer function for the Goertzel algorithm is:

$$H_k = \frac{1 - e^{-j2\pi\frac{k}{N}}}{1 - c \cdot z^{-1} + z^{-2}}, \quad (1)$$

where c is the Goertzel coefficient, $$c = 2\cos\left(2\pi\frac{k}{N}\right)$$

and N is the number of samples in a frame. The value of k is defined by:

$$k = \frac{N}{F_s} \cdot F_{tone}, \quad (2)$$

where $F_s$ is the sampling frequency (i.e., 8 kHz in typical telephone systems), $F_{tone}$ is the frequency nearest the DTMF frequency that keeps the value of k to an integer. The energy of each DTMF frequency point, k, is calculated by the feed forward and feedback phase. The feedback phase is calculated as:

$$Q_k(n) = c \cdot Q_k(n-1) - Q_k(n-2) + x(n), \quad (3)$$

where $Q_k(-1) = Q_k(-2) = 0$, n=0, 1, 2, ..., N-1. $Q_k(n-1)$ and $Q_k(n-2)$ are feedback storage elements for a frequency point, and x(n) is the current input sample value.

The energy in each DTMF frequency bin, k, is calculated in the feedforward phase (i.e., n=N) by the equation:

$$E(dtmf) = |Y_k(N)|^2 = Q_k^2(N-1) + Q_k^2(N-2) - Q_k(N-1) \cdot Q_k(N-2) \cdot c \quad (4)$$

After the energy of each DTMF frequency is calculated, the largest magnitude in each frequency band is compared to a threshold. If the energy in one of the bins exceeds the threshold, a DTMF tone may be present.

The Goertzel algorithm has difficulties meeting the required DTMF frequency distortion test. According to the industry standards, DTMF signals within a certain percentage of frequency distortion must be detected as valid DTMF tones. The DTMF signals must be rejected if the distortion exceeds certain larger percentages. FDTMF is defined as a standard DTMF frequency, and F is the actual frequency of the received signal. Based on the AT&T standard, if the F is within ±1.5% of $F_{DTMF}$, it is a valid tone. If F is not within ±3.5% of $F_{DTMF}$, it is not a valid tone.

Since the Goertzel algorithm finds energy aligned at the frequency of the N-point DFT, the corresponding frequency point, $F_{tone}$, is not exactly aligned with the desired DTMF frequency, because N and k are integers. As a result, the energy is distributed among neighboring frequency bins, referred to as leakage. Leakage degrades the accuracy of the frequency domain outputs.

Suppose the calculated frequency is 2.0% larger than the desired DTMF frequency. A -2.0% error in the input signal moves the frequency to be exactly on the bin, and a +2.0% error moves the frequency further away from the bin and generates a very small output. The asymmetric effect complicates the selection of a frequency distortion threshold. Significant computational resources are required to determine if an energy value is at the left or right side of a frequency bin. Accordingly, setting different thresholds for left and right side distortion is not practical. Changing the window size, N, for the DTMF detection minimizes the asymmetric effect. However, no window size can completely eliminate the asymmetric effect.

Industry standards suggest a frame size of 205 samples, or 25.625 ms. A detector should detect a tone of at least 40 ms, but no less than 20 ms. The tone should be preceded by at least 40 ms of non-DTMF signal. To accept a DTMF tone detection, the detector should detect the tone in two consecutive frames. Considering a tone length of 40 ms, using the standard sample size of 205 causes detection difficulties.

The received tone may not be well aligned with the frame boundary, resulting in the timing diagram shown in FIG. 1A. The timing for three consecutive frames 11, 12, and 13 is shown. Each frame represents 205 samples, and the length of a received signal 15 is 40 ms. The received signal 15 is misaligned with respect to the boundaries of the frames 11, 12, 13. The second frame 12 is a full energy frame, but the first and third frames 11, 13 are only artial energy frames. Depending on the degree of misalignment, the DTMF detector could fail to detect the tone in both of the partial energy frames 11, 13, and the two consecutive frame hit requirement would not be met. Accordingly, the tone would be missed.

Previous methods to accommodate for frame misalignment have employed special processing techniques to align the received signal 15 with the frame boundary, as shown in FIG. 1B. Even with frame alignment, the third frame 13 is still a partial energy frame. As a result, the energy response shape for the third frame 13 will differ from that of the second frame 12. FIG. 1C illustrates a full frame frequency response 16 and a partial frame frequency response 17. The energy variation between the full and partial energy responses 16, 17 may result in the evaluation results not being consistent across the frames 12, 13, thus reducing the detection accuracy. The frame alignment method helps to improve the accuracy of the detector, but results in a more complicated and costly implementation.

The present invention is directed to overcoming, or at least reducing the effects of, one or more of the problems set forth above.

SUMMARY OF THE INVENTION

In one aspect of the present invention, an signal detector is provided for detecting at least a first signal having a first frequency. The signal detector includes a matched transform unit and an energy level threshold unit. The matched transform unit is adapted to receive at least a first frame of time domain input samples at a sampling frequency and generate at least a first frequency energy value for the first frame based on at least a first subset of the time domain input samples and a first matched filter coefficient. The sampling frequency is a non-integral multiple of the first frequency, and the first matched filter coefficient depends on the first frequency. The energy level threshold unit is adapted to compare the first frequency energy value to a threshold energy value to determine the presence of the first signal.

In another aspect of the present invention, a method is provided for detecting at least a first signal having a first frequency. The method includes receiving at least a first frame of time domain input samples at a sampling frequency. At least a first frequency energy value for the first frame is generated based on at least a first subset of the time domain input samples and a first matched filter coefficient. The sampling frequency is a non-integral multiple of the first frequency, and the first matched filter coefficient depends on the first frequency. The first frequency energy value is compared to a threshold energy value to determine the presence of the first signal.

BRIEF DESCRIPTION OF THE DRAWINGS

Other objects and advantages of the invention will become apparent upon reading the following detailed description and upon reference to the drawings in which.

Figure 1A:
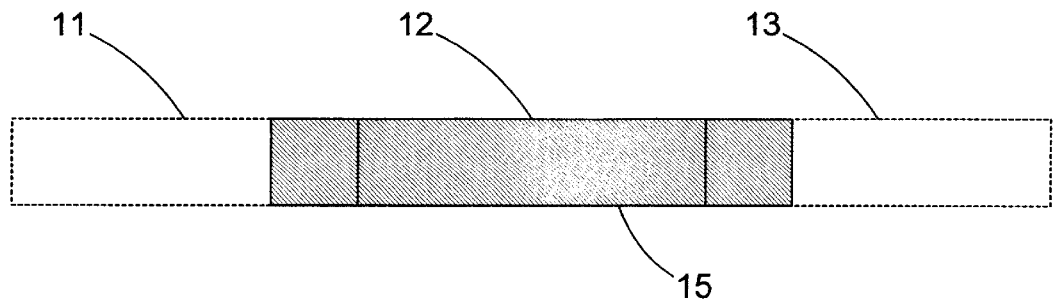
FIGS. 1A and 1B are timing diagrams of the frame and signal alignment for a prior art DTMF detection method.
Figure 1B:
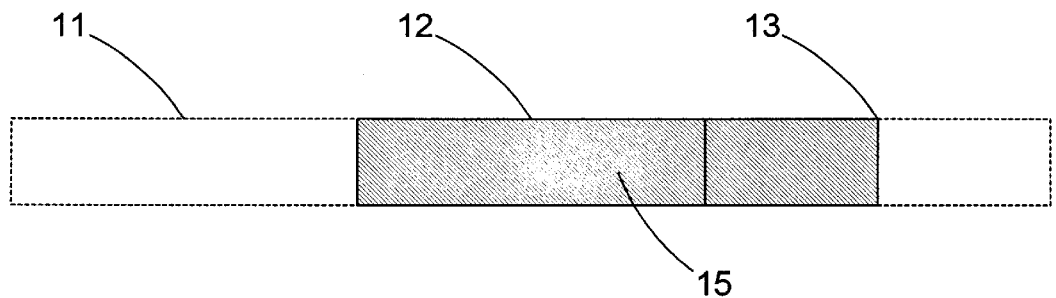
Figure 1C:
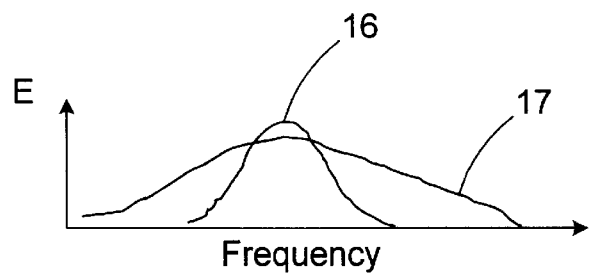
FIG. 1C is a graph illustrating the frequency response of a full energy frame and a partial energy frame.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
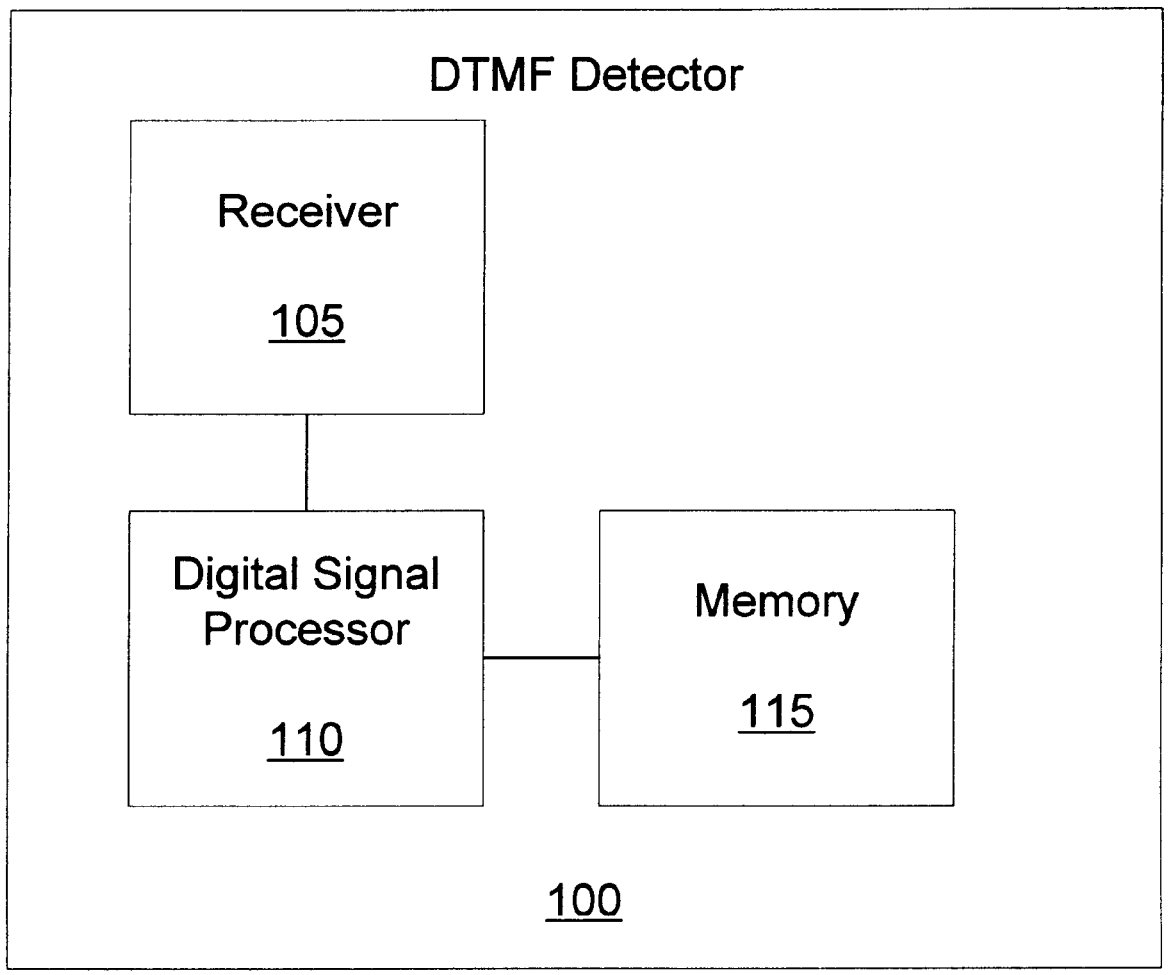
FIG. 2 is a block diagram of a signal detector in accordance with the present invention.

Referring to FIG. 2, a block diagram of a dual tone multifrequency (DTMF) detector 100 is provided. The DTMF detector 100 includes a receiver 105, a digital signal processor 110, and a memory 115. The receiver 105 receives an analog signal and converts the analog signal into digital format. The receiver 105 samples the analog signal and utilizes pulse code modulation (PCM) or other suitable techniques to produce corresponding digital data. The receiver 105 may include linear analog to digital (A/D) converters (not shown).

It is noted that the received signal may be compressed or companded, and thus digital data produced by the A/D converter (not shown) in the receiver 105 may be companded (i.e., may comprise logarithmically compressed digital data). As is well-known in the art, companding refers to logarithmically compressing a signal at the source and expanding the signal at the destination to obtain a high end-to-end dynamic range while reducing dynamic range requirements within the communication channel. If the signal is companded, the receiver 105 logarithmically expands the data to a linear format. It is also contemplated that the DTMF detector 100 may receive digital signals (i.e., linear or logarithmic) directly, and thus a receiver 105 is not required in the DTMF detector 100 for analog to digital conversion.

Figure 3:
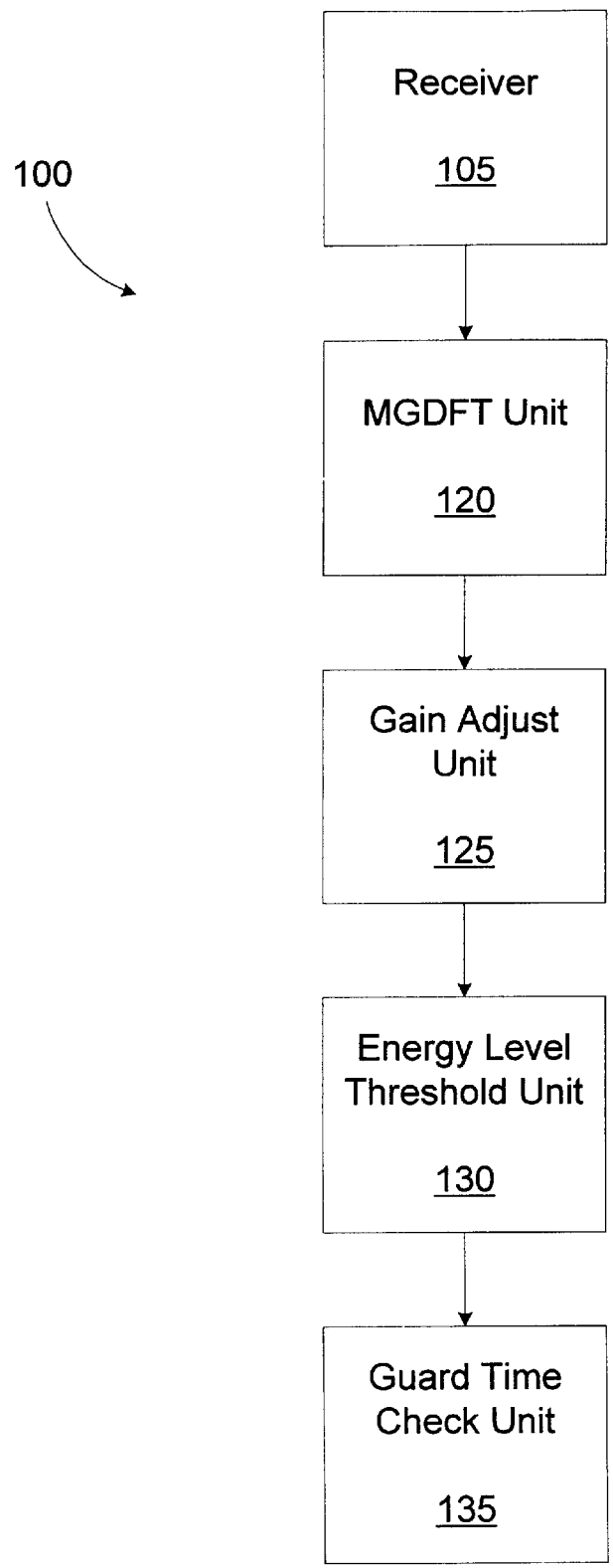
FIG. 3 is a functional block diagram of the signal detector of FIG. 2.

A functional block diagram of the DTMF detector 100 is provided in FIG. 3. The DTMF detector 100 includes the receiver 105 adapted to sample the input signal, a Matched Goertzel Discrete Fourier Transform (MGDFT) unit 120 adapted to transform the time domain samples of the receiver 105 to frequency domain energy values, a gain unit 125 adapted to scale the output of the MGDFT unit 120 based on any asymmetry in sample sizes, an energy level threshold unit 130 adapted to determine if a DTMF tone is present in the input signal, and a guard time check unit 135 adapted to determine if the DTMF tone has an acceptable duration.

It is contemplated that any or all of the functions of the receiver 105, MGDFT unit 120, the gain unit 125, the energy level threshold unit 130, and the guard time check unit 135 may be accomplished by the digital signal processor 110. The memory 115 may be a read-only memory, a random access memory, or a combination thereof. The memory 115 may be employed to store program instructions for execution by the digital signal processor 110. Also, the results of calculations completed by the digital signal processor 110 may be stored in the memory 115. It is also contemplated that a microprocessor (not shown) or other type of general purpose processor (not shown) may be used to perform any or all of the functions of the receiver 105, the MGDFT unit 120, the gain unit 125, the energy level threshold unit 130, and the guard time check unit 135.

In the illustrated embodiment, the receiver 105 samples at a frequency of 8 kHz, a common sampling frequency used in telephone systems. The time domain sampling data provided by the receiver 105 is received by the MGDFT unit 120. The MGDFT unit 120 determines energy output values at various frequency bins as described below.

To improve the accuracy of the DTMF detector 100, the frequency response should be determined at the exact DTMF frequencies. This is accomplished by combining the transfer function of a matched filter given by the equation:

$$H_k = \frac{1}{1 - 2\cos\left(2\pi \frac{F_{DTMF}}{F_s}\right) \cdot z^{-1} + z^{-2}}, \quad (5)$$

with the standard Goertzel equation given by equation 1 to generate a matched Goertzel transfer function defined by:

$$H_k = \frac{1 - e^{-j2\pi \frac{F_{DTMF}}{F_s} N}}{1 - 2\cos\left(2\pi \frac{F_{DTMF}}{F_s}\right) \cdot z^{-1} + z^{-2}}. \quad (6)$$

The matched filter coefficient given by the equation, $$c_m = 2\cos\left(2\pi \frac{F_{DTMF}}{F_s}\right), \quad (7)$$

is substituted for the standard Goertzel coefficient in equations 3 and 4 to determine the energy present in the input signal for each of the DTMF frequencies specified in Table 1. The MGDFT unit 120 determines the energy at the exact DTMF frequency to improve accuracy. However, because the matched filter coefficient is not an integer, there are inherent energy variations between frames due to the periodic nature of the DFT.

Other energy variations between frames may be caused due to the effects of the partial frame energy described above. To reduce the overall cross-frame energy variation, the frame size is selected to ensure that at least two full energy frames are present for a received DTMF signal. The MGDFT unit 120 may be configured to use the same frame width for all DTMF frequencies, or alternatively, the frame width may be frequency dependent to reduce energy variation. For the case where the same frame width is selected for all DTMF frequencies, a frame width of 106 samples (i.e., 13.25 ms) is selected.

Figure 4A:
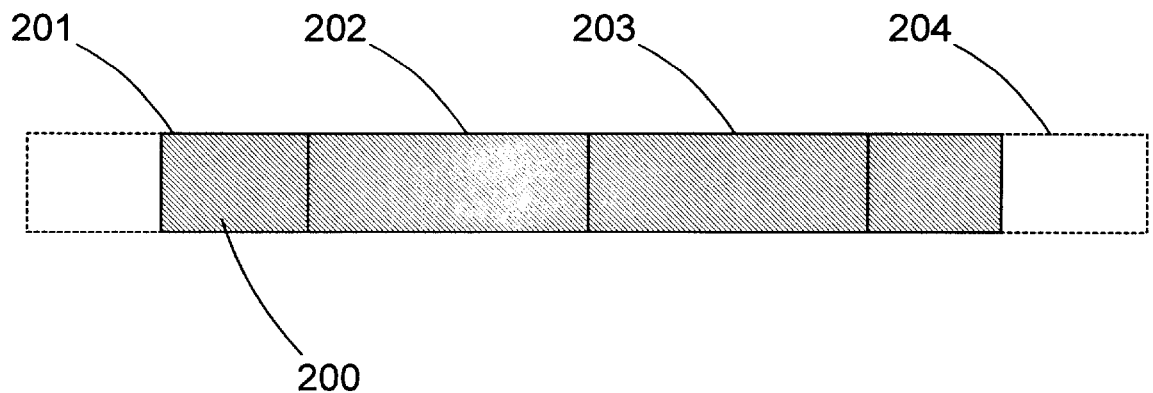
FIGS. 4A and 4B illustrate timing diagrams of a received DTMF signal.
Figure 4B:
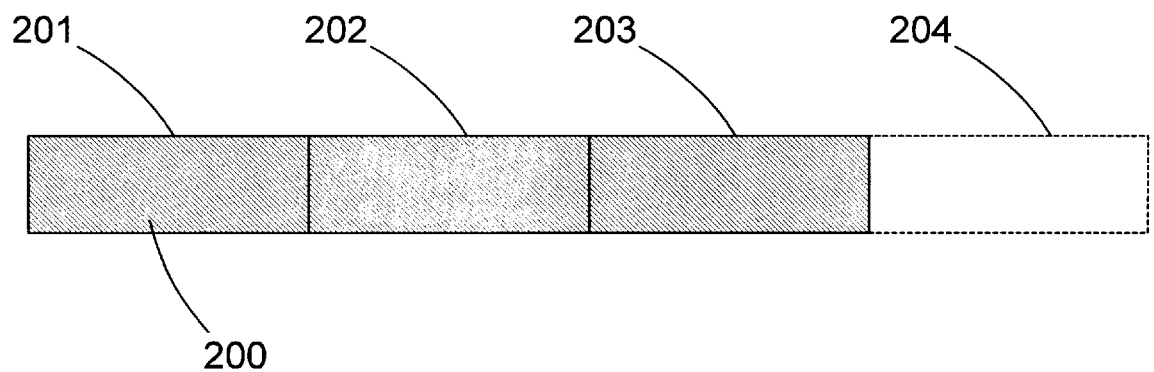

FIGS. 4A and 4B illustrate timing diagrams of a received DTMF signal 200 having a duration of about 40 ms. The timing is shown for four frames 201, 202, 203, 204. In FIG. 4A, the starting time of the received signal 200 is not aligned with the boundaries of the frames 201, 202, 203, 204. Nevertheless, the second and third frames 202, 203 are both full energy frames. In FIG. 4B, the starting time of the received signal 200 is aligned with the boundaries of the frames 201, 202, 203, 204. Again, the second and third frames 202, 203 are both full energy frames. Because the frame size ensures at least two full energy frames, additional processing to align the received signal 200 with the frame boundaries is not required, thus simplifying and lowering the cost of the DTMF detector 100. The smaller frame width also increases the detection speed.

To further enhance the performance of the MGDFT unit 120, the frame widths may be optimized for the various DTMF frequencies. The period for each DTMF frequency depends on the sampling frequency, $F_s$, and the DTMF frequency. The closer the period is to an integer value, the less energy variation is present. The period is determined by the equation:

$$p = N \cdot \frac{F_{DTMF}}{F_s}. \quad (8)$$

Because the values of N are differ among the DTMF frequencies, the energy output values should be normalized prior to comparison. The gain adjust unit 125 receives the raw energy output values from the MGDFT unit 120 and scales the energy output value for the DTMF frequencies by the normalization ratio:

$$Gain_f = \left(\frac{N_{\min}}{N_f}\right)^2 = \left(\frac{102}{N_f}\right)^2. \quad (9)$$

The frame width, period, period error, and gain factor for each DTMF frequency are shown below in Table 2.

TABLE 2

| DTMF Frequency | N | Gain Factor | Period | Period Error |
| --- | --- | --- | --- | --- |
| 697 | 103 | 0.99 | 8.97 | 0.03 (0.33%) |
| 770 | 104 | 0.98 | 10.01 | 0.01 (0.1%) |
| 857 | 103 | 0.99 | 10.97 | 0.03 (0.27%) |
| 941 | 102 | 1.00 | 12.00 | 0.00 (0.00%) |
| 1209 | 106 | 0.962 | 16.02 | 0.02 (0.125%) |
| 1336 | 102 | 1.00 | 17.03 | 0.03 (0.18%) |
| 1477 | 103 | 0.99 | 19.02 | 0.02 (0.11%) |
| 1633 | 103 | 0.99 | 21.02 | 0.02 (0.01%) |

The output of the gain adjust unit 115 is received by the energy level threshold unit 130. The energy level threshold unit 130 evaluates the energy output values for each DTMF frequency to determine the presence of any DTMF tones. A number of static and dynamic thresholding techniques are known in the art for determining if a DTMF tone is present. For example, the energy level threshold unit 130 may accept a tone having an energy level above a static threshold (i.e., 100). It is contemplated that the energy level threshold unit 130 may a perform other screening techniques known in the art such as second harmonic thresholding, twist computation, or the like to determine the presence of the DTMF tone.

After determining if the energy level is above the threshold, the digital signal processor 110 may set a flag indicating a frame detection, or may set a flag indicating no detection. The flag may be an internal flag within the digital signal processor 110 or a flag within the memory 115.

The guard time check unit 135 tracks the detection history of the DTMF tones to determine if the duration of the DTMF tone is within specifications. As stated above, a DTMF tone should be preceded by at least 40 ms of silence. To accept a DTMF tone detection, the guard time check unit 135 checks for three frame indicators of no detection (i.e., 39.75 ms of silence) followed by at least two frame indicators of detection (i.e., at least 26.5 ms of tone). Because the frame size is selected to guarantee two frames of full tone, the guard time check is simplified as compared to prior art detection techniques. The digital signal processor 110 may set a flag indicating a frame detection or may set a valid detection flag indicating a detection if the guard time check unit 135 indicates the detection pattern described above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A signal detector for detecting at least a first signal having a first frequency, comprising:
    a matched transform unit adapted to receive at least a first frame of time domain input samples at a sampling frequency, generate at least a first frequency energy value for the first frame based on at least a first subset of the time domain input samples and a first matched filter coefficient, generate at least a second frequency energy value for the first frame based on at least a second subset of the time domain input samples and a second matched filter coefficient wherein the sampling frequency is a non-integral multiple of the first frequency, and the first matched filter coefficient depends on the first frequency; and
    an energy level threshold unit adapted to compare the first frequency energy value to a threshold energy value to determine the presence of the first signal, and compare the second frequency energy value to the threshold energy value to determine the presence of a second signal having a second frequency, wherein the sampling frequency is a non-integral multiple of the second frequency and the second matched filter coefficient depends on the second frequency.

2. The signal detector of claim 1, further comprising:
    a receiver adapted to sample an input signal and generate the first frame of time domain input signal samples.

3. The signal detector of claim 1, wherein the energy level threshold unit is adapted to provide a frame detection indicator based on the comparison of the first frequency energy value and the threshold energy value, wherein the frame detection indicator designates a detection in response to the first frequency energy value being greater than the threshold energy value, and a non-detection in response to the first frequency energy value being less than the threshold energy value.

4. The signal detector of claim 3, wherein the matched transform unit is adapted to receive a plurality of frames of time domain input samples and generate a plurality of frequency energy values corresponding to the plurality of frames, and the energy level threshold unit is adapted to compare the plurality of frequency energy values to the threshold energy value to determine a plurality frame detection indicators.

5. The signal detector of claim 4, further comprising a guard time check unit adapted to receive the plurality of frame detection indicators and provide a valid detection indicator in response to at least two consecutive frame detection indicators designating detection.

6. The signal detector of claim 5, wherein the guard time check unit is adapted to provide the valid detection indicator in response to at least three consecutive frame detection indicators designating non-detection prior to the at least two consecutive frame detection indicators designating detection.

7. The signal detector of claim 1, wherein the first signal has a minimum duration, and the first subset of the first frame has a width of less than about one half of the minimum duration.

8. The signal detector of claim 7, wherein the minimum duration is about 40 ms.

9. The signal detector of claim 1, wherein the number of samples in the first subset equals the number of samples in the second subset.

10. The signal detector of claim 1, wherein the number of samples in the first subset is different than the number of samples in the second subset.

11. The signal detector of claim 1, further comprising a gain adjust unit adapted to normalize one of the first and second frequency energy values based on the number of samples in the first subset and the number of samples in the second subset.

12. A signal detector for detecting at least a first signal having a first frequency, comprising:
    a matched transform unit adapted to receive at least a first frame of time domain input samples at a sampling frequency and generate at least a first frequency energy value for the first frame based on at least a first subset of the time domain input samples and a first matched filter coefficient, wherein the number of samples in the first subset is between about 95 and 115, the sampling frequency is a non-integral multiple of the first frequency, and the first matched filter coefficient depends on the first frequency; and
    an energy level threshold unit adapted to compare the first frequency energy value to a threshold energy value to determine the presence of the first signal.

13. The signal detector of claim 1, wherein the number of samples in the second subset is between about 95 and 115.

14. The signal detector of claim 1, wherein the second signal has a minimum duration, and the second subset of the first frame has a width of less than about one half of the minimum duration.

15. The signal detector of claim 14, wherein the minimum duration is about 40 ms.

16. The signal detector of claim 1, wherein the first matched filter coefficient is based on the first frequency, and the first frequency is at least one of 697 Hz, 770 Hz, 852 Hz, 941 Hz, 1209 Hz, 1336 Hz, 1477 Hz, and 1633 Hz.

17. A signal detector for detecting a first signal having a first frequency, comprising:
    a processor adapted to receive at least a first frame of time domain input samples at a sampling frequency; and
    a memory device coupled to the processor and adapted to store program instructions, that when executed by the processor:
        generate at least a first frequency energy value for the first frame based on at least a first subset of the time domain input samples and a first matched filter coefficient, wherein the sampling frequency is a non-integral multiple of the first frequency, and the first matched filter coefficient depends on the first frequency;

generate at least a second frequency energy value for the first frame based on at least a second subset of the time domain input samples and a second matched filter coefficient;

compare the first frequency energy value to a threshold energy value to determine the presence of the first signal; and compare the second frequency energy value to the threshold energy value to determine the presence of a second signal having a second frequency, wherein the sampling frequency is a non-integral multiple of the second frequency and the second matched filter coefficient depends on the second frequency.

18. The signal detector of claim 17, further comprising:
a receiver adapted to sample an input signal and generate the first frame of time domain input signal samples.

19. The signal detector of claim 17, wherein the program instructions, when executed by the processor, provide a frame detection indicator based on the comparison of the first frequency energy value and the threshold energy value, the frame detection indicator designating a detection in response to the first frequency energy value being greater than the threshold energy value and a non-detection in response to the first frequency energy value being less than the threshold energy value.

20. The signal detector of claim 19, wherein the processor is adapted to receive a plurality of frames of time domain input samples, and the program instructions, when executed by the processor, generate a plurality of frequency energy values corresponding to the plurality of frames and compare the plurality of frequency energy values to the threshold energy value to determine a plurality frame detection indicators.

21. The signal detector of claim 20, wherein the program instructions, when executed by the processor, provide a valid detection indicator in response to at least two consecutive frame detection indicators of the plurality of frames detection indicators designating detection.

22. The signal detector of claim 21, wherein the program instructions, when executed by the processor, provide the valid detection indicator in response to at least three consecutive frame detection indicators of the plurality of frame detection indicators designating non-detection prior to the at least two consecutive frame detection indicators designating detection.

23. The signal detector of claim 17, wherein the first signal has a minimum duration, and the first subset of the first frame has a width of less than about one half of the minimum duration.

24. The signal detector of claim 23, wherein the minimum duration is about 40 ms.

25. The signal detector of claim 17, wherein the number of samples in the first subset equals the number of samples in the second subset.

26. The signal detector of claim 17, wherein the number of samples in the first subset is different than the number of samples in the second subset.

27. The signal detector of claim 17, wherein the program instructions, when executed by the processor, normalize one of the first and second frequency energy values based on the number of samples in the first subset and the number of samples in the second subset.

28. A signal detector for detecting a first signal having a first frequency, comprising:
a processor adapted to receive at least a first frame of time domain input samples at a sampling frequency; and
a memory device coupled to the processor and adapted to store program instructions, that when executed by the processor:

generate at least a first frequency energy value for the first frame based on at least a first subset of the time domain input samples and a first matched filter coefficient, wherein the number of samples in the first subset is between about 95 and 115, the sampling frequency is a non-integral multiple of the first frequency, and the first matched filter coefficient depends on the first frequency; and compare the first frequency energy value to a threshold energy value to determine the presence of the first signal.

29. The signal detector of claim 17, wherein the number of samples in the second subset is between about 95 and 115.

30. The signal detector of claim 17, wherein the second signal has a minimum duration, and the second subset of the first frame has a width of less than about one half of the minimum duration.

31. The signal detector of claim 30, wherein the minimum duration is about 40 ms.

32. The signal detector of claim 17, wherein the first matched filter coefficient is based on the first frequency, and the first frequency is at least one of 697 Hz, 770 Hz, 852 Hz, 941 Hz, 1209 Hz, 1336 Hz, 1477 Hz, and 1633 Hz.

33. A method for detecting at least a first signal having a first frequency, comprising:

receiving at least a first frame of time domain input samples at a sampling frequency;

generating at least a first frequency energy value for the first frame based on at least a first subset of the time domain input samples and a first matched filter coefficient, wherein the sampling frequency is a non-integral multiple of the first frequency, and the first matched filter coefficient depends on the first frequency;

generating at least a second frequency energy value for the first frame based on at least a second subset of the time domain input samples and a second matched filter coefficient;

comparing the first frequency energy value to a threshold energy value to determine the presence of the first signal; and comparing the second frequency energy value to the threshold energy value to determine the presence of a second signal having a second frequency, the second matched filter coefficient depending on the second frequency and the sampling frequency being a non-integral multiple of the second frequency.

34. The method of claim 33, further comprising:
sampling an input signal to generate the first frame of time domain input signal samples.

35. The method of claim 33, further comprising:
providing a frame detection indicator based on the comparison of the first frequency energy value and the threshold energy value, wherein the frame detection indicator designates a detection in response to the first frequency energy value being greater than the threshold energy value, and a non-detection in response to the first frequency energy value being less than the threshold energy value.

36. The method of claim 35, further comprising:
receiving a plurality of frames of time domain input samples;
generating a plurality of frequency energy values corresponding to the plurality of frames; and
comparing the plurality of frequency energy values to the threshold energy value to determine a plurality frame detection indicators.

37. The method of claim 36, further comprising:

providing a valid detection indicator in response to at least two consecutive frame detection indicators designating detection.

38. The method of claim 37, wherein providing the valid detection indicator includes:

providing the valid detection indicator in response to at least three consecutive frame detection indicators designating non-detection prior to the at least two consecutive frame detection indicators designating detection.

39. The method of claim 33, wherein the first signal has a minimum duration, and generating the first frequency energy value includes generating the first frequency energy value based on the first subset of the first frame, the first subset having a width of less than about one half of the minimum duration.

40. The method of claim 39, wherein generating the first frequency energy value includes generating the first frequency energy value based on the first subset of the first frame, the first subset having a width of less than about 20 ms.

41. The method of claim 33, wherein the number of samples in the first subset equals the number of samples in the second subset.

42. The method of claim 33, wherein the number of samples in the first subset is different than the number of samples in the second subset.

43. The method of claim 33, further comprising:

normalizing one of the first and second frequency energy values based on the number of samples in the first subset and the number of samples in the second subset.

44. The method of claim 33, wherein the second signal has a second duration, and the second subset of the first frame has a width of less than about one half of the second duration.

45. The method of claim 44, wherein generating the second frequency energy value includes generating the second frequency energy value based on the second subset of the first frame, the second subset having a width of less than about 20 ms.

46. The method of claim 33, wherein the second signal has a minimum duration, and generating the second frequency energy value includes generating the second frequency energy value based on the second subset of the first frame, the second subset having a width of less than about one half of the minimum duration.

47. The method of claim 33, wherein generating the first frequency energy value based the first matched filter coefficient, includes generating the first frequency energy value based on the first matched filter coefficient, the matched filter coefficient being based on the first frequency, and the first frequency being at least one of 697 Hz, 770 Hz, 852 Hz, 941 Hz, 1209 Hz, 1336 Hz, 1477 Hz, and 1633 Hz.

48. A signal detector for detecting a first signal having a first frequency, comprising:

means for receiving at least a first frame of time domain input samples at a sampling frequency;

means for generating at least a first frequency energy value for the first frame based on at least a first subset of the time domain input samples and a first matched filter coefficient, wherein the sampling frequency is a non-integral multiple of the first frequency, and the first matched filter coefficient depends on the first frequency;

means for generating at least a second frequency energy value for the first frame based on at least a second subset of the time domain input samples and a second matched filter coefficient;

means for comparing the first frequency energy value to a threshold energy value to determine the presence of the first signal; and means for comparing the second frequency energy value to the threshold energy value to determine the presence of a second signal having a second frequency, the second matched filter coefficient depending on the second frequency and the sampling frequency being a non-integral multiple of the second frequency.

49. A method for detecting at least a first signal having a first frequency, comprising:

receiving at least a first frame of time domain input samples at a sampling frequency;

generating at least a first frequency energy value for the first frame based on at least a first subset of the time domain input samples and a first matched filter coefficient, wherein the number of samples in the first subset is between about 95 and 115, the sampling frequency is a non-integral multiple of the first frequency, and the first matched filter coefficient depends on the first frequency; and comparing the first frequency energy value to a threshold energy value to determine the presence of the first signal.

* * * * *